Dec. 2, 1924.
H. E. HAYWARD
COMBINATION TOOL
Filed Aug. 14, 1922
1,517,986
2 Sheets-Sheet 1
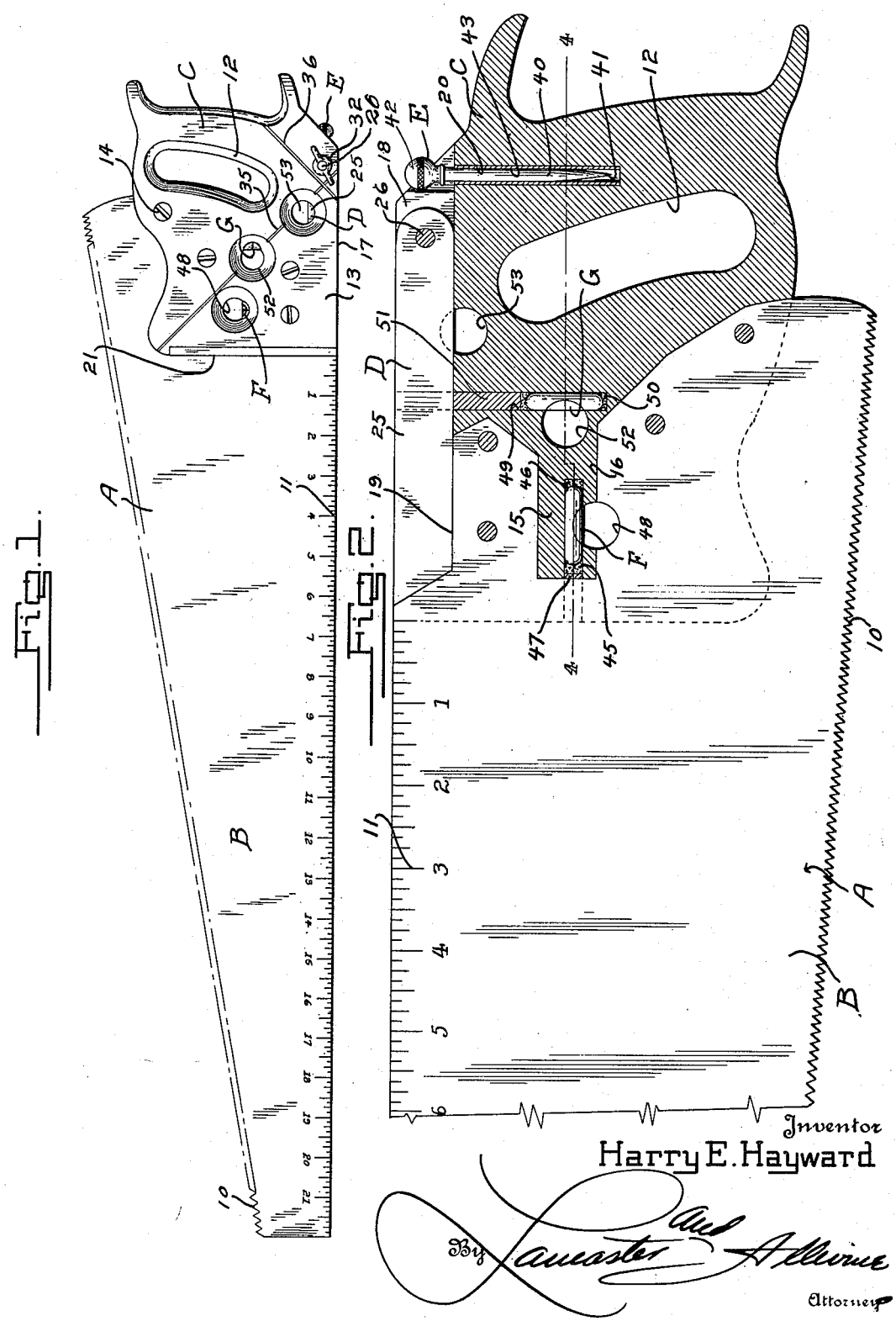
Inventor
Harry E. Hayward
By Lancaster and Allwine
Attorneys Dec. 2, 1924.
H. E. HAYWARD
COMBINATION TOOL
Filed Aug. 14, 1922
1,517,986
2 Sheets-Sheet 2
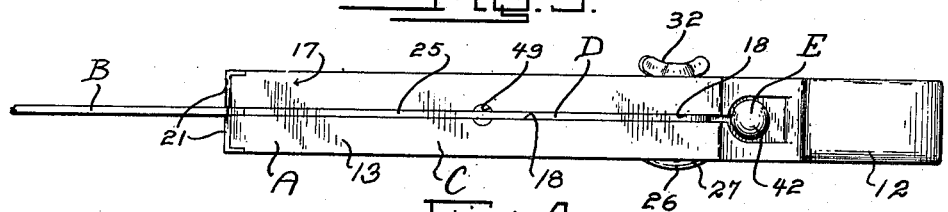
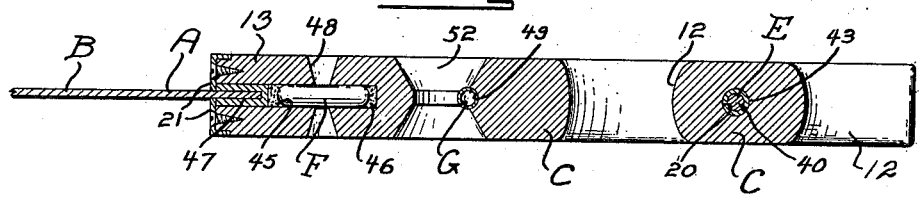
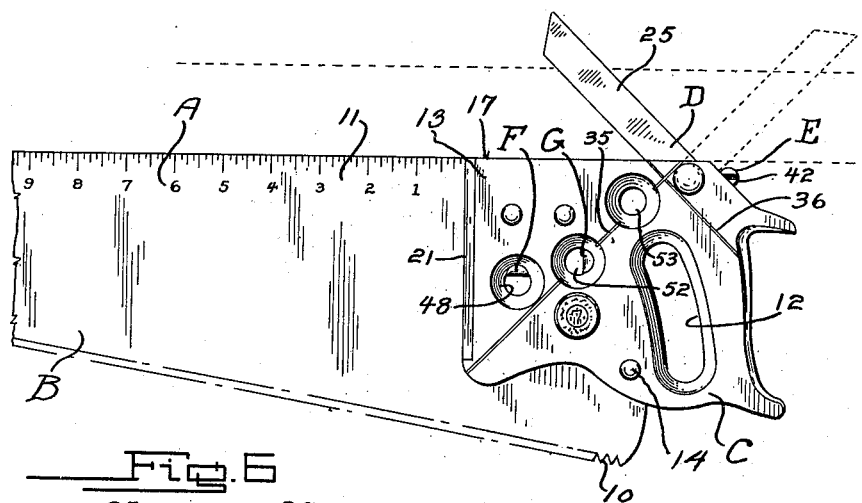
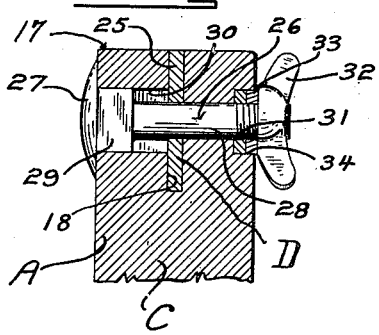
Inventor
Harry E. Hayward
By Lancaster and Allwine
Attorneys Patented Dec. 2, 1924.

1,517,986

UNITED STATES PATENT OFFICE.

HARRY E. HAYWARD, OF ST. PETERSBURG, FLORIDA.

COMBINATION TOOL.

Application filed August 14, 1922. Serial No. 581,794.

*To all whom it may concern:*

Be it known that I, HARRY E. HAYWARD, a citizen of the United States, residing at St. Petersburg, in the county of Pinellas and State of Florida, have invented certain new and useful Improvements in Combination Tools, of which the following is a specification.

This invention relates to tools and the primary object of the invention is to provide, in a combination tool of the saw type, novel means for incorporating a plurality of different tools in a saw handle, in such a manner that all of such tools when not in use will lie within the planes of the faces of the saw handle and thereby form a compact and durable construction, the said tools in connection with the saw permitting the saw to be used for a number of different purposes, such as measuring, marking different kinds of work, and the like.

A further object of the invention is to provide a novel means for forming the handle and saw blade, and associating the said handle and blade together in a novel manner so as to permit the saw to be used as a square, the handle forming the butt for the square, and the saw blade the arm or blade of the square, the blade having suitable graduations formed thereon.

A further object of the invention is to provide a novel means for incorporating means for marking bevels with the saw handle, the upper end of the handle being slotted to receive the bevel marking arm, which is pivotally associated with the handle, the handle having suitable markings thereon for facilitating the moving of the bevel to different degrees in relation to the handle.

A further object of the invention is to provide a novel means for associating the marking point or instrument with the saw handle, the head of the marking point or instrument forming a stop for the bevel blade or arm when the same is in one position at an angle of 45 degrees to the saw handle.

A further object of the invention is to provide a novel means for associating a pair of right-angularly disposed levels in the saw handle, so that the said saw can be effectively used as a level and a plumb.

A still further object of the invention is to provide an improved combination tool of the saw type of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings forming a part of this specification, in which drawings:

Figure 1 is a side elevation of the improved tool showing the same being used as a level and for marking purposes;

Fig. 2 is a fragmetary side elevation of the rear end of the tool showing the handle therefor in longitudinal section and illustrating the novel means for associating the various tools therewith;

Fig. 3 is a fragmentary end view of the improved tool showing a plan view of the handle thereof with the bevel marking tool and the marking pin associated therewith;

Fig. 4 is a fragmentary longitudinal section through the handle portion of the tool taken on the line 4—4 of Fig. 2;

Fig. 5 is a fragmentary elevation of the improved tool showing the same being used for marking bevels; and Fig. 6 is an enlarged fragmentary transverse section through the handle of the tool showing the means carried thereby for holding the bevel marking blade or arm in adjusted position in relation to the handle.

Referring to the drawings in detail, wherein similar reference characters designate corresponding parts throughout the several views, the letter A generally indicates the improved combination tool, which includes the saw blade B, the handle C, the bevel D, the marking instrument or pin E, and the levels F and G.

As can be seen by referring to the drawings the tool is in the form of a saw and the blade B and handle C thereof is of substantially the same construction and shape as ordinary saw blades and handles. The saw blade B has one longitudinal edge thereof inclined toward its outer end and provided with saw teeth 10. The opposite or upper longitudinal edge of the blade is formed straight to provide a marking surface and can be provided with suitable graduations 11 to permit the same to be used for measuring purposes.

The handle C is made of wood or any other desired material and has the rear end thereof provided with a suitable hand grip 12 of conventional design to permit the operation of the saw, and the other or forward end of the handle is provided with an inwardly extending longitudinally disposed slot which extends from the upper to the lower edge of the handle and bifurcates the forward or inner end of the handle to provide a pair of side plates 13 between which is positioned the rear end of the saw blade B. The saw blade B is secured to the handle in any preferred manner such as by fastening elements 14. Intermediate the upper and lower longitudinal edges of the handle the side plates 13 are integrally connected by an integral portion 15 of the handle which terminates short of the forward edge of the handle and this portion 15 is adapted to carry the level F, which will be hereinafter more fully described. The rear end of the saw blade is notched, as at 16 for the reception of said portion 15 of the handle. The upper edge of the handle C is provided with a straight face 17 which is in direct alinement with the straight edge of the saw blade B and forms an extension thereof. The upper edge of the handle is provided with a longitudinally extending slot 18 which extends inwardly from the rear edge of the handle toward the front edge thereof and communicates with the forward slotted portion of the handle, and the saw blade B has its upper edge notched as at 19 in direct alinement with the slot 18. The slot 18 and the notch 19 formed in the blade B form a sheath or a pocket for the reception of the marking bevel D, which will be hereinafter more fully described. The upper edge of the handle C at the rear end thereof is provided with an inwardly extending recess 20 which opens out through the slot 18, and this opening or recess 20 is adapted to receive the marking pin E, which will also be hereinafter more fully described. The forward edge of the handle C is also provided with a straight edge which is disposed at right angles to the straight edge of the saw blade B, and the plates 13 defined by the slotted portion of the handle can be provided with suitable metallic wear strips 21, and these strips 21 in connection with the straight edge of the blade form a square and it can be seen that the handle forms the butt of the square while the saw blade B forms the arm or blade of the square.

The marking bevel D comprises a blade or arm 25 fitted in the slot 18 of the handle and notch portion 19 of the saw blade, and the outer edge of this arm or blade 25 is adapted to extend flush with the upper edge of the handle C and the blade B of the saw. The blade 25 is mounted upon a suitable pivot pin 26 extending transversely through the upper edge of the handle C adjacent to the rear end of the slot 18, and this pivot permits the arm or blade 25 to be swung out of the slot 18 to different adjusted positions. As shown the pivot 26 is in the nature of a bolt and is provided with a head 27 at one end thereof. Adjacent to the head 27, the shank 28 which forms the pivot is provided with an enlarged polygonal extension 29 which is fitted within a polygonal opening 30 formed in the handle which prevents rotation of said pivot. The end of the shank 28 which is opposite to the head 27 is provided with suitable threads 31 on which is threaded a suitable winged nut 32. Placed upon the shank 28 are a plurality of resilient spilt washers 33 which normally rest in an enlargement 34 formed in the bore or bearing opening for the pin 26. It is obvious that by tightening the nut 32, the walls of the slot 18 will be brought into intimate frictional contact with the bevel marking blade or arm 25 and thus hold the same against movement when in its adjusted position.

The handle C has its opposite faces thereof provided with a pair of diverging gage lines 35 and 36 which extend at an angle of 45° to the straight edge 17 of the handle C and to the said blade B. Thus it can be seen that when the bevel marking blade or arm 25 is swung to alinement with either one of these lines the same will be at an angle of 45° to the work and thus permit bevels to be marked thereon. These lines 35 and 36 can be in the nature of grooves, or suitable strips of wood of different color from the handle C can be inlaid therein.

The marking pin E is of any preferred construction and consists of a shank 40 having one end pointed as at 41 to form the marking point and the opposite end provided with a manipulating head 42. The opening 20 is provided with a suitable sheath 43 for the reception of said marking pin and the marking pin E is adapted to make a snug fit in said sheath so that loss of said pin will be prevented.

The head 42 of the pin E also acts as a stop for the bevel marking blade or arm 25 when the same is moved into adjusted position in alinement with the 45° line 35. This is clearly shown in Fig. 5, and thus it can be seen that the marking pin performs a dual function and the location thereof forms an important feature of this invention.

The levels F and G are of the usual construction and consist of transparent tubes each filled with suitable liquid and provided with the air bubble, and these levels F and G are disposed at right angles to each other as can be clearly seen by referring to Figs. 1, 2, and 5. The portion 15 of the handle C hereinbefore described is provided with an inwardly extending bore 45 in which the level F is fitted and the level can be held in place by any suitable means such as plaster of Paris or the like 46 and the end of the bore is fitted with a plug 47. In order to permit the bubble to be seen within the level F the handle is provided with a transverse enlarged opening 48 which is disposed intermediate the ends of said level.

In use of the level F, the saw is grasped and held in a horizontal position and laid upon the work and by glancing at the level it can be seen whether the work is level or not.

The handle C is provided with a second bore 49 which extends at right angles to the bore 45 and this bore extends inwardly from the upper edge of the handle to a point short of the lower edge thereof. The level G is fitted within said bore 49 and held in place by any suitable means such as plaster of Paris 50. The bore is then filled or stopped up by suitable plug 51. When the bevel marking blade or arm 25 is in its closed position within the slot 18 and the notch 19, the same overlies the plug 51 as can be clearly seen by referring to the drawings. A transversely extending opening 52 is formed within the handle C and is positioned substantially intermediate the ends of the level G so as to facilitate seeing the air bubble within said level.

When it is desired to use the level G the hand grip portion 12 of the saw is grasped and the saw held in a vertical position with the straight edge thereof in engagement with the work. By glancing at the level G it can be seen whether or not the work is plumb.

In order to facilitate moving the bevel marking arm or blade 25 in the slot 18 and the notch 19 the handle C is provided with a transverse opening 53 which communicates with the inner end of said slot 18 and thus the inner edge of the marking arm or bevel blade 25 rests within said opening, and when it is desired to move the bevel blade to its active position it is merely necessary to insert the finger within the opening 53 and push up on said bevel marking blade 25.

From the foregoing description it can be seen that a compact device has been provided which can be used as a saw, a rule, a square, a level, and a plumb, a bevel, and a marking point.

Changes in details may be made without departing from the spirit or the scope of this invention; but,

I claim:

1. A tool comprising a blade having one longitudinal edge provided with a straight marking surface, a handle secured to one end of the blade and having one longitudinal edge thereof flush with the marking edge of the blade and its forward transverse edges at right angles to the marking edge of the blade, the opposite faces of the handle being provided with degree lines extending at an angle of 45° to the straight marking edges of the blade and handle and a bevel marking blade pivotally associated with the handle and adapted to be swung to alinement with either one of said degree lines.

2. In a tool of the character described, a blade having one longitudinal edge thereof provided with a straight face, a handle secured to one end of said blade having one longitudinal edge thereof provided with a straight face in alinement with the straight face of the blade, the handle having a longitudinally extending slot formed in said face and the blade having a notch in alinement with said slot, a marking bevel arm fitted within said lot and notch, means pivotally securing said arm to said handle to permit the same to be swung out of said groove and notch at an angle to the straight faces of said handle and blade, and means carried by said pivot means for holding the arm in any preferred adjusted position.

3. In a device of the character described, a blade provided with a longitudinal straight edge, a handle secured to one end of the blade provided with a straight longitudinal edge in alinement with the straight longitudinal edge of the blade, the opposite faces of the handle being provided with degree lines extending at an angle of 45° to the straight marking edges of the blade and handle, the mentioned edge of the handle being provided with a longitudinally extending slot and the mentioned edge of the blade with a notch in alinement with said slot, a bevel marking arm adapted to normally rest in said slot and notch, a non-rotatable pivot bolt extending transversely through said handle and pivotally supporting said arm, the handle being provided with an opening for said bolt, the outer end of said opening being enlarged, resilient washers fitted on said bolt in said enlarged portion of the opening, and a thumb-nut threaded upon said bolt for compressing said washers and bringing the walls of the slot in intimate contact with the arm to hold the same in adjusted position, the arm being adapted to be moved in alinement with said degree lines.

4. In a tool of the character described, a handle having a straight longitudinal marking edge provided with a slot, a bevel arm adapted to normally seat in said slot, means pivotally securing the arm at one end to said handle, the handle having an inwardly extending recess therein, a marking pin provided with a head detachably fitted within said recess, the head of said pin being disposed in the path of said marking bevel arm for holding said arm at an angle of 45° to the straight marking edge of said handle.

5. In a tool of the character described, a blade provided with a straight longitudinal marking edge, a handle provided with a straight longitudinal marking edge in alinement with the straight edge of the blade, the forward end of the handle being bifurcated to receive the rear end of the blade, means securing the handle to the blade, the handle having its forward edge provided with a straight surface, an inwardly extending bore formed in the handle, a level vial fitted within said bore, a plug closing said bore, a metallic wear strip disposed over the front straight edge of the handle closing said bore, the straight longitudinal edge of the handle being provided with a slot, a bore extending inward of said slot, a plumb vial fitted within said second-mentioned bore, a plug fitted in said bore, and a bevel marking arm normally disposed in said slot for covering said bore.

HARRY E. HAYWARD.